United States Patent [19]
Dufrancatel

[11] 4,396,222
[45] Aug. 2, 1983

[54] INTERIOR FITTINGS OF A VEHICLE SUCH AS A FOLDING CARAVAN

[75] Inventor: Michel Dufrancatel, Mougins, France

[73] Assignee: Esterel Caravanes, Le Houlme, France

[21] Appl. No.: 244,893

[22] Filed: Mar. 18, 1981

[30] Foreign Application Priority Data

Mar. 21, 1980 [FR] France ............................. 80 06340
Sep. 26, 1980 [FR] France ............................. 80 20677

[51] Int. Cl.³ .............................................. B60P 3/32
[52] U.S. Cl. ................................. 296/165; 296/27; 296/173; 312/258; 312/313
[58] Field of Search ............... 296/26, 27, 165, 172, 296/173, 176; 312/258, 313, 325, 269

[56] References Cited
U.S. PATENT DOCUMENTS 2,338,477  1/1944  Wolters ............................. 312/313
3,838,880 10/1974  Lefebvre ........................... 296/27
4,150,861  4/1979  Dufrancatel ...................... 312/269

Primary Examiner—Joseph F. Peters, Jr.
Assistant Examiner—John A. Carroll

[57] ABSTRACT

A folding caravan in which upper parts of the side walls are foldable inwardly of the caravan from a vertical to a horizontal attitude. The caravan contains at least two pieces of furniture adjacent opposite said side walls, these pieces being opposite or partly opposite one another. The first piece which is tall has a stationary base and an upper part pivoted thereon to fold down onto the caravan floor. The second piece of furniture also has a stationary base and an upper part pivotably connected to that base by a parallelogram linkage permitting this upper part to swing off the base and sit on the folded down upper part of the first piece, thus allowing enough room for the upper parts of the side walls to be folded.

11 Claims, 17 Drawing Figures

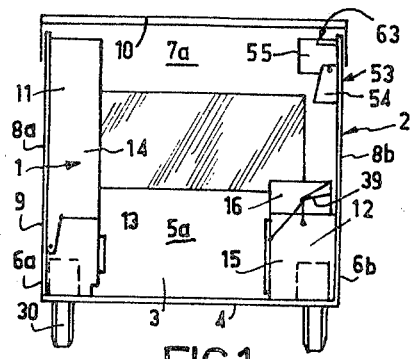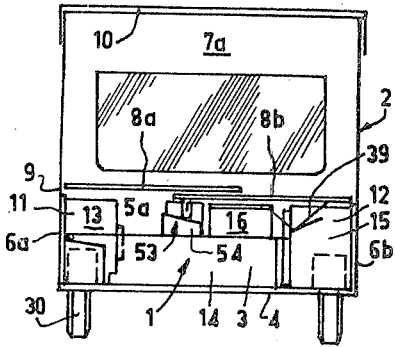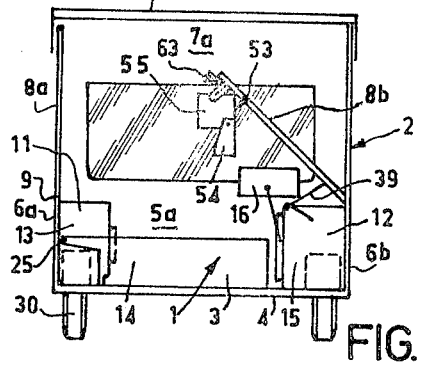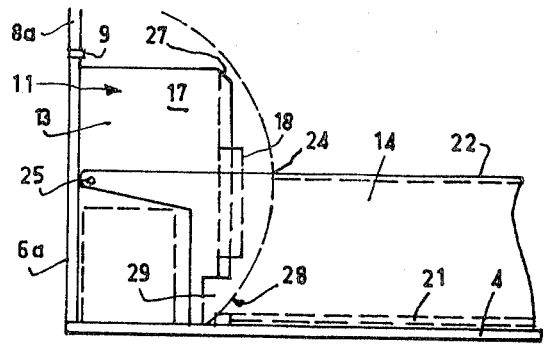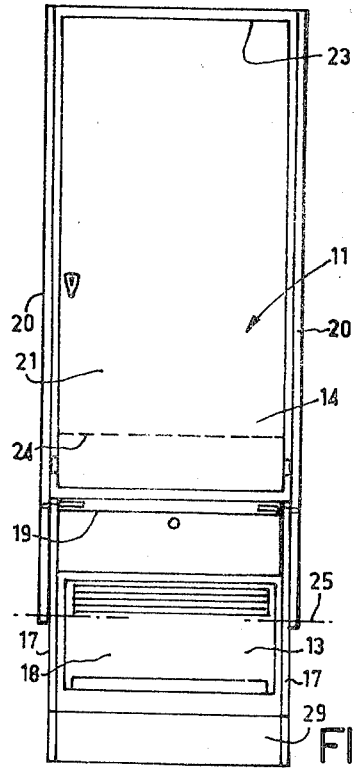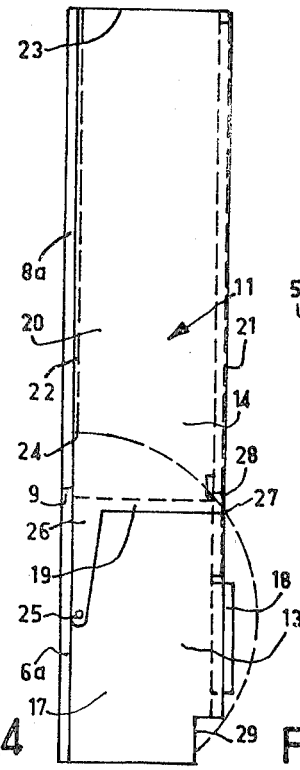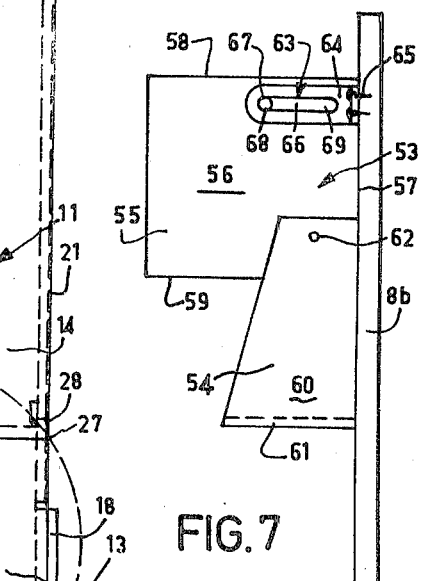

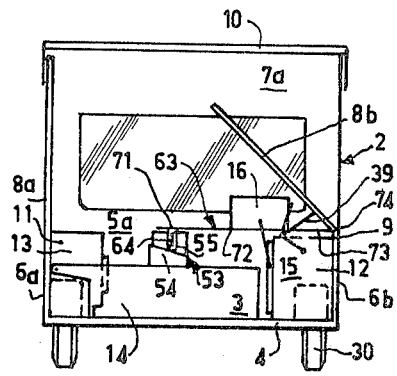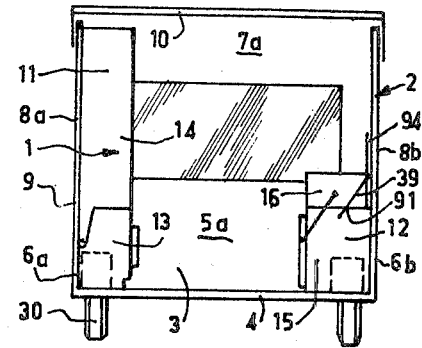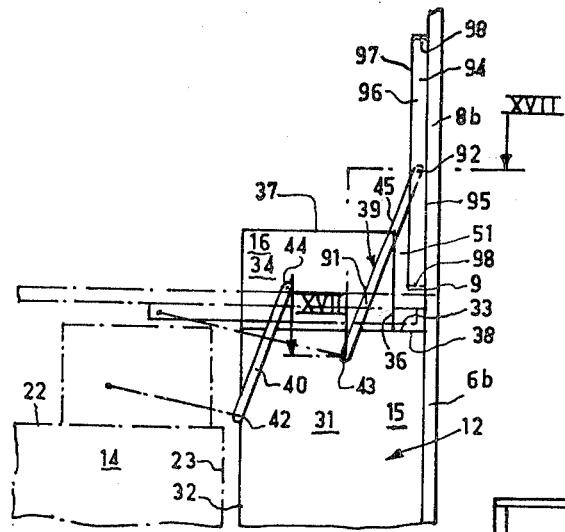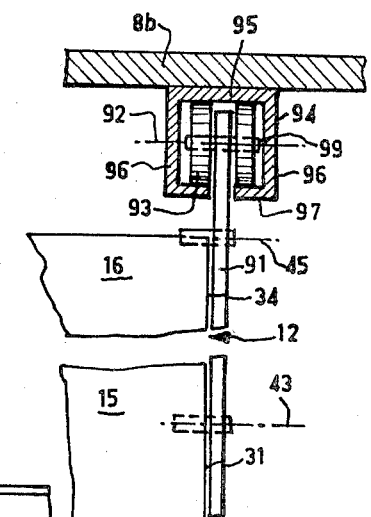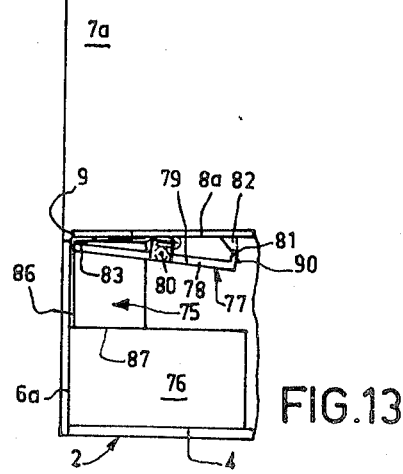

INTERIOR FITTINGS OF A VEHICLE SUCH AS A FOLDING CARAVAN

The invention relates to the interior fittings of a vehicle such as a folding caravan.

A folding caravan comprises a lower body, having a floor and four lower vertical panels; four upper panels mounted to pivot on the respective lower panels, placed either vertically or horizontally when the caravan is respectively opened out or folded; a roof associated with the front and rear upper panels, resting either on the latter, or on the body when the caravan is respectively opened out or folded (French Pat. No. 2 284 480).

Known interior fittings of a caravan of this type comprise a first piece of furniture with a first base rigidly connected to a first lower side panel and a first upper member mounted to pivot on the base, which is able to move between two positions, namely a retracted horizontal position and a vertical position for use in which it is associated with a first upper side panel; and a second piece of furniture having a second base rigidly connected to a second lower side panel and a second movable upper member intended to be placed against the second upper side panel. As a variation, the fittings comprise a third piece of furniture which, in the position for use, is associated with the second upper side panel straight above the second piece of furniture. The second upper member and the third piece of furniture are mounted in a detachable manner so that they can be placed either in a position for use, or retracted into the body when the caravan is respectively opened out and folded. For the fittings and the upper side panels, the folding operation necessitates the five following successive stages: disconnecting the third piece of furniture from the upper panel, laying it down and locking it to the floor. Movement of the second upper member, laying it down and locking it to the floor, swinging the first upper member through 90° into its horizontal position where it rests on the second upper member, by the upper end of its front side. Successive swinging of the second and of the first upper side panel resting respectively on the first upper member and the second panel. For opening out the fittings, the same operations are carried out in the reverse order.

As a variation, the fittings also comprise a fourth piece of furniture associated in the position for use with the first upper side panel, at the side of the first piece of furniture in particular straight above a fixed lower piece of furniture such as a chest or the like. The folding operation thus also necessitates the disengagement and locking of this fourth piece of furniture before swinging of the upper side panels.

This method of operation is long, tedious, requires considerable physical efforts, presents a risk of upsetting the contents of the second upper member and of the third piece of furniture and involves means for securing the pieces of furniture in the retracted position.

Attempts have already been made to remedy these drawbacks partially by connecting the second upper member to the second base by kinematic connection and gripping means, which nevertheless does not reduce the number of stages of the operation.

In certain known fittings, the first upper member fits in the first base, whereof the upper part must be devoid of upper and front panels so that it is not possible to store objects permanently. In other fittings, the height of the first base is similar to that of the second upper member and in the retracted position the first upper member rests on the first base and the second member, thus at a distance from the floor, which is troublesome.

According to the invention there is provided interior fittings of a holding vehicle comprising a lower body having a floor and four lower side panels, four side upper panels mounted to pivot on the lower panels, the fittings comprising a first piece of furniture having a first base rigidly connected to a first said lower side panel and a first upper member mounted to pivot on the first base about a first longitudinal pivot, said first upper member being able to move between a horizontal retracted position and a vertical position for use where it is connected to a first said upper side panel, a second piece of furniture having a second base connected rigidly to a second said lower side panel and a second movable upper member, the distance between the floor and the first pivot corresponds at least substantially to the overall depth of the first upper member in order that in the retracted position of the first upper member a front wall of the first upper member rests on the floor, the second upper member is connected to the second base and to the second said upper side panel by first kinematic connecting means such that the movement of the second upper side panel causes the accompanying movement of the second upper member between an upper position for use in which it rests on the second base when the second upper side panel is vertical and a retracted lower position, when the second upper side panel is horizontal, in which it rests at least partly on a rear wall of the first upper member in the retracted position, the first and second pieces of furniture being located at least partly in facing relationship, the first kinematic connecting means also having the function of keeping the second upper member in a constant relative position.

The fittings may comprise a third piece of furniture connected to the upper or lower second side panel by second kinematic means. In the retracted position, the third piece of furniture rests on the bottom of the first upper member. The fittings may comprise a fourth piece of furniture also associated with third kinematic means connected to the first upper or lower side panel.

The invention also relates to a method for folding or conversely opening out a folding vehicle comprising internal fittings of this type and to the vehicle comprising these fittings, such as a caravan.

The invention provides numerous advantages: the folding and opening-out operations are easy, since the operator has to handle solely the first upper member and the two upper side panels. The operator does not have to support the second upper member and possibly the third piece of furniture. The second upper member and the third piece of furniture remain in their initial relative position and the contents of the latter do not have to be removed. In the retracted position the second upper member and the third piece of furniture rest on the first upper member which provides better stability. The specific means for securing the interior fittings to the floor are superfluous. The first base may comprise upper and front panels and objects may be housed therein permanently. The internal space of the folded caravan is utilized better for the storage of the various pieces of furniture in the retracted position, in particular on two levels, which provides more floor space which can be used for storing other movable objects in the caravan.

Other features of the invention will become apparent from the ensuing description referring to the accompanying drawings in which:

FIGS. 1, 2 and 3 are three diagrammatic views in section through a vertical and transverse plane of a folding caravan comprising interior fittings according to the invention respectively completely opened out; partly opened out, the second upper side panel being inclined and partly opened out, the first and second upper side panels being in the horizontal position.

FIGS. 4 and 5 are respectively diagrammatic elevational and side views of the first piece of furniture of the interior fittings, in the position for use.

FIG. 6 is a diagrammatic partial side view of the first piece of furniture in the retracted position.

FIGS. 7 and 8 are two diagrammatic side views of the third piece of furniture of the interior fittings, respectively in the position for use and in the retracted position.

FIGS. 11, 12 and 13 are three diagrammatic side views of the fourth piece of furniture of the interior fittings, respectively in the position for use, the partially retracted position and the fully retracted position.

FIG. 14 is a diagrammatic sectional view through a vertical and transverse plane, similar to FIG. 2, showing a variation of the second kinematic means.

FIG. 15 is a diagrammatic sectional view through a vertical and transverse plane of a folding caravan comprising a variation of the interior fittings, in the completely opened out position.

FIG. 16 is a diagrammatic side view of the second piece of furniture of the interior fittings of FIG. 15, respectively in the retracted position for use.

FIG. 17 is a diagrammatic sectional view on line XVII—XVII of FIG. 16.

Figure 8:
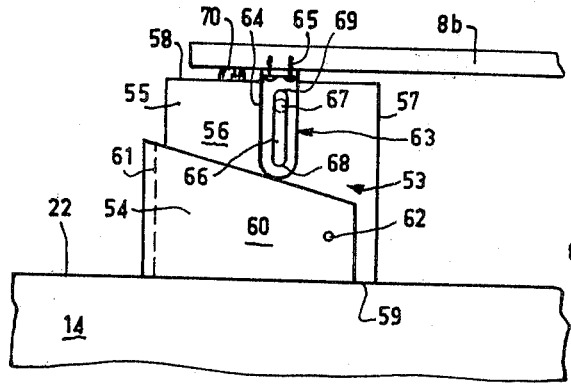

The invention relates to the interior fittings 1 for a folding caravan 2, which comprises a rigid lower body 3 having a horizontal floor 4 and four fixed lower panels, namely two front and rear panels 5a and 5b and two left and right side panels 6a and 6b; four upper panels namely two front and rear panels 7a and 7b and two left and right side panels 8a and 8b, mounted to pivot on the respective lower panels 5a,5b,6a,6b about horizontal pivot points 9, which are at least substantially coplanar in a plane P; and a roof 10 connected in a pivoting and sliding manner to the panels 7a, 7b by their horizontal edge remote from the pivot points 9. The caravan 2 may be located in two extreme positions, namely completely opened out (FIG. 1) or completely folded. When opened out, the panels 7a, 7b, 8a, 8b and the corresponding lower panels 5a,5b, 6a,6b are coplanar and the roof 10 in the upper position rests on the panels 7a, 7b, 8a, 8b. When the caravan is folded, the panels 7a, 7b, 8a, 8b are placed substantially horizontally and the roof 10 rests on the body 3. The caravan 2 may comprise pneumatic jacks located between the body 3 and the panels 7a,7b. The caravan comprises at least one door, in particular in the panels 6a, 8a and at least one window in at least one of the panels 7a,7b,8a,8b.

The fittings 1 can naturally be used in other types of caravans or vehicles.

The fittings 1 comprise at least one first piece of furniture 11 and a second piece of furniture 12. The piece of furniture 11 comprises a first base 13 and a first upper member 14. The piece of furniture 12 comprises a second base 15 and a second upper member 16.

The base 13 has a general parallelepipedal shape, defined by two vertical side walls 17, a vertical front wall 18, a horizontal upper wall 19 and a bottom constituted by a first in particular left-hand lower side panel 6a. This base 13 is connected rigidly to the floor 4 and to the panel 6a, housed integrally in the body 3 below the plane P, closed off at its upper end both horizontally as well as vertically and intended to receive objects, in particular permanently.

The member 14—such as a hanging-wardrobe—has a general paralelepipedal shape limited by two vertical side walls 20, two parallel walls namely a front wall 21 and back wall 22, an upper wall 23 at the top end remote from the base 13.

The member 14 has no lower wall. The wall 22 comprises a cut-out 24 at its lower end adjacent the base 13.

The member 14 is mounted to pivot on the base 13 about a first longitudinal, horizontal pivot point 25, parallel to the panels 6a,6b and close to the panel 6a between two extreme positions, namely a retracted horizontal position (FIGS. 2,3,6) or a vertical position for use (FIGS. 1,4,5).

Each wall 20 comprises at its lower end and at least adjacent the back 22, a coplanar projection 26 located on the outside and against the wall 17 for the fitting of the pivot point 25. The distance between the floor 4 and the pivot point 25 is at least substantially equal to the overall depth of the member 14 (between the walls 21 and 22), in order that in the retracted position, the wall 21 rests on the floor 4. The absence of a lower wall and the cut-out 24 facilitate pivoting of the member 14. The depth of the cut-out 24 is such that it is able to pass opposite the first edge 27 defined by the walls 18 and 19, which comprises a possible chamfer, in the same way as the second edge 28 defined by the lower horizontal edge of the wall 21. The lower end of the base 13 comprises a front recess 29 for accommodating the edge 28.

The piece of furniture 11 comprises means for locking the member 14 in the vertical position, which means are located either between this member and the panel 8a, or preferably between this member and the base 13, for example these means may be removable pins cooperating with apertures or bolts.

The piece of furniture 12 is located at least partly opposite the piece of furniture 11. The veritcal and transverse planes of symmetry of the pieces of furniture 11, 12 preferably merge or are adjacent, in particular in line with the wheels 30.

The base 15 has a general parallelepipedel shape limited by two vertical side walls 31, a vertical front wall 32 and possibly an upper horizontal wall 33 located in particular in the vicinity of the plane P. This base 15 is fitted integrally in the body 3 below the plane P, rigidly connected to the floor 4 and to the panel 6b which constitutes the back thereof.

The distance between the pivot point 25 and the wall 32 is at least equal to that between the pivot point 25 and the wall 23 in order that in the retracted position the member 14 does not interfere with the base 15, whilst being located in the vicinity of the latter.

The member 16 has a general parallelepipedal shape limited by two vertical side walls 34, a front wall 35, a back wall 36, two upper and lower horizontal walls 37 and 38. This member 16 may be located in two extreme positions, namely an upper position for use or a lower retracted position. In the position for use, it rests by its wall 38 on the wall 33 or by its walls 34 on the two walls 31. When retracted, it is housed in the free space defined by the retracted member 14, the base 15 and the panel 8b. It thus bears at least partially on the wall 22, in the vicinity of the base 15. To this end, the distance between the walls 37 and 38 is at the most equal to and preferably similar to the distance between the wall 22 of the retracted member 14 and the plane P.

The member 16 is connected to the base 15 and to the panel 8b by first kinematic connecting means 39, whereof a first function is to bring about a movement of the member 16 accompanying that of the panel 8b in order that when the latter is in the vertical position and horizontal position, the member 16 is in its respective position for use and retracted position and a second function is to keep the member 16 in a relative constant horizontal position.

Figure 9:
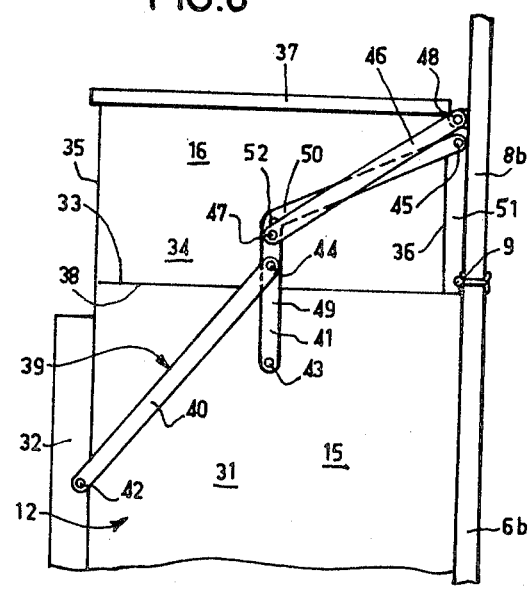
FIGS. 9 and 10 are two diagrammatic side views of the second piece of furniture of the interior fittings respectively in the position for use and in the retracted position.

In one possible embodiment (FIGS. 9,10), the means 39 comprise two arrangements of small rods located on either side of the piece of furniture 12 and associated with its walls 31 and 34. Each of these arrangements comprises a pair of rods 40,41 each pivoted at one end to the base 15 about pivots 42,43 and at the other end to the member 16 about pivots 44,45. The pivots 42,43,44,45 define a deformable parallelogram. A third rod 46 is pivoted to the rod 41 and to the panel 8b about pivots 47,48. The pivots 42,43,44,45,47,48 are parallel, horizontal and longitudinal. The rod 40 is rectilinear. The rod 41 comprises two sections 49,50 respectively adjacent the pivots 43,45 and inclined one with respect to the other, in particular by a value of between 90° and 180°, the concave side of which faces the panel 8b.

The pivots 42,43,44,45,47 and 48 are located such that when the panel 8b pivots downwards, it does not interfere with the member 16.

Figure 10:
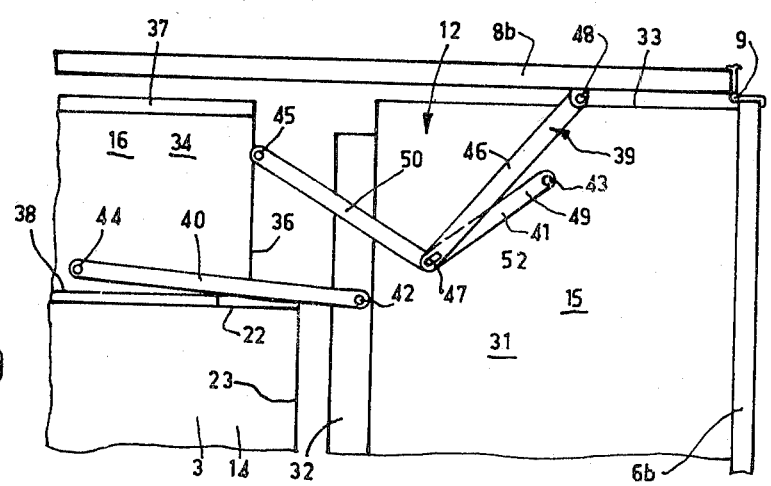

The pivot 42 is adjacent the wall 32 and the plane of the wall 22 of the retracted member 14 (FIG. 10). The pivot 43 is located substantially at an equal distance from the wall 32 and from the panel 8b, from the horizontal plane passing through the pivot 42 and from the wall 33. The pivot 44 is adjacent the wall 38 and substantially at an equal distance from the walls 35 and 36. The pivot 45 is located in the vicinity of the walls 36,37. The section 49 is shorter than the section 50. The pivot 47 is adjacent the point where the sections 49,50 join. The pivot 48 is adjacent a horizontal plane passing through the wall 37, the member 16 being in the position for use.

For example, the ratios of the spacing between the various pivots are in the embodiment illustrated as follows: the spacing between the pivots 45 and 47, 47 and 48 is comprised between approximately 1.4d and 1.5d, d being the spacing between the pivot 43 and 47. The spacing between the pivots 43 and 45 on the one hand, 42 and 44 on the other hand, is of the order of 2d. When the member 16 is in the position for use, the wall 36 is preferably at a distance from the panel 8b in order to provide a space 51 for accommodating the pivot 48. The pivot 47 is mounted to pivot and slide in a slot 52 provided in the rod 41. This clearance makes it possible to eliminate the necessity for great accuracy in the kinematic means 39 and means that the member 16 is not moved, when the caravan is folded and that the panel 8b undergoes a slight movement.

The fittings 1 may comprise a third movable piece of furniture 53, intended to be connected to the panel 8b in the vicinity of its upper horizontal edge, straight above the piece of furniture 12 when the caravan 2 is opened out.

In one possible embodiment, the piece of furniture 53 comprises two third members, namely a lower member 54 and an upper member 55. As a variation, the piece of furniture 53 comprises only the member 55.

The member 55 has a general parallelepipedal shape defined by two vertical side walls 56, a vertical back wall 57, a possible front wall and two horizontal walls, namely an upper wall 58 and lower wall 59. The member 54 essentially comprises two vertical side cheeks 60, a lower horizontal wall 61 and possibly a back. The member 54 is mounted to pivot on the member 55 about a second horizontal, longitudinal pivot point 62 which is preferably located at the upper and lower ends respectively of the members 54 and 55, in the vicinity of the wall 57, in the region of the centre of gravity of the member 54, the depth of which is less than that of the member 55. The pivot 62 is further from the wall 61 than from the front side of the member 55 and located substantially at an equal distance from the walls 57 and 59.

The member 55 may occupy two extreme positions, namely a position for use (FIG. 7) or a retracted position (FIG. 8). In the position for use, the member 55 is suspended and bears by its wall 57 against the panel 8b, under its own weight.

The retracted member 55 bears against the wall 22 of the retracted member 14. The spacing between the walls 58, 59 is at the most equal, preferably similar to the distance between the wall 22 of the retracted member 14 and the plane P.

The member 54 may occupy two extreme positions, separated by an angle of 90°, namely a position for use and a retracted position. In the position for use, it is suspended from the member 55 by the pivot 62 and pressed against the wall 8b. When retracted (FIG. 8), it encloses the member 55, its wall 61 being located in front of the front side of the member 55, the rear edges of the cheeks 60 being substantially coplanar with the wall 59, thus outside the walls 56.

The piece of furniture 53, in particular the member 55, is connected to the panel 8b or 6b by second kinematic connecting means 63. In a first variation (FIGS. 1 to 3, 7 and 8), the piece of furniture 53 is connected by the means 63 to the panel 8b so that the movement of this panel causes the accompanying movement of the piece of furniture 53 or at the very least of the member 55. When the panel 8b is in its respective vertical and horizontal positions, the members 54,55 are in their corresponding position for use and retracted position. The passage of the member 55 from its position for use to its retracted position is achieved manually.

For example, the means 63 comprise two arrangements located on either side of the piece of furniture 53, connected to the walls 56, each comprising a bracket 64 connected rigidly and at right angles to the panel 8b by securing members 65, located in the vicinity of the wall 56 and provided with an oblong slot 66, the general direction of which is perpendicular to the panel 8b, with which a lug 67 cooperates, said lug being rigidly connected at right angles to the wall 56, in the vicinity of the wall 58, approximately at an equal distance from the wall 57 and from the front side of the member 55. The arrangements of the lug 67 and of the pivot 62 are such that in their position for use, the members 54 and 55 are normally biased by their own weight against the panel 8b.

When the panel 8b swings downwards, the piece of furniture 53 retains its relative initial position. It pivots about lugs 67 around brackets 64 in the front end parts 68 of the slots 66. When the panel 8b is in the immediate vicinity of its horizontal position, the member 54 is pivoted manually into its retracted position, which is possible since the panel 8a is vertical. The swinging of the panel 8b is continued until it is horizontal, the lug 67 sliding in the slot 66 as far as the bottom end part 69. The panel 8b rests on the wall 57 in particular through the intermediary of a damping member 70.

In another variation (FIG. 14) the means 63 are connected to the panel 6b at the point of or in the vicinity of its upper horizontal edge or to the panel 8b at the point of or in the vicinity of its lower horizontal edge, or to the hinge between the panels 6b and 8b. The means 63 thus comprise a rigid frame, of general at least pseudo-flat shape and having a contour of general U shape or pseudo U shape comprising a horizontal web 71 and two parallel arms 72 pivoted at their free end 73 remote from the web 71 to the panels 6b,8b or their hinge, as mentioned above, about a horizontal pivot 74, parallel to or coinciding with the pivot point 9 of the panel 8b. Fixed rigidly to the web 71 and substantially at right angles to the plane of the frame 71,72 are means for the connection to the piece of furniture 53, in particular such as the brackets 64. Means are thus provided for securing the piece of furniture 53 and/or the frame 71,72 to the panel 8b, when the piece of furniture 53 is in the position for use, such as a bolt, catch etc. At the time of the folding operation, the securing means are unlocked, then the frame 71,72 is swung from its vertical position coplanar with the panel 8b and into its horizontal position, the panel 8b remaining vertical in order to be swung into its horizontal position subsequently.

In a possible variation of the piece of furniture 53 (not shown), one or both side walls 56 comprise coplanar cheeks directed downwards below the wall 59, constituting feet resting on the floor 4 when the piece of furniture 53 is in the retracted position, whilst assisting in supporting the latter on the panel 8b in the position for use. This variation is particularly intended for the case of a piece of furniture 53 which is wider than the first piece of furniture 11, or which does not come in line with the latter.

Figure 11:
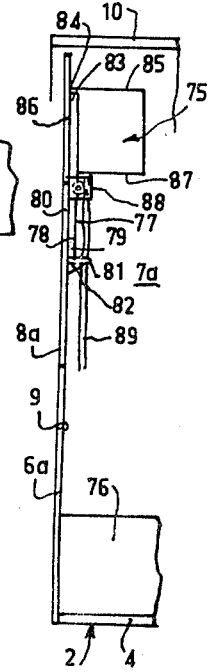
Figure 12:
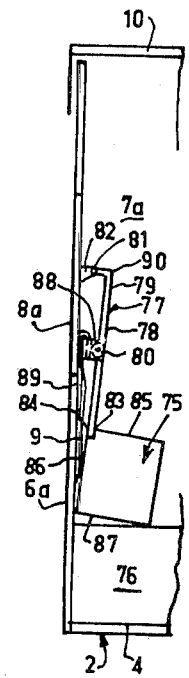

The fittings may possibly comprise one or more fourth pieces of furniture (FIGS. 11 to 13) 75 connected to the panel 8a, located, in the position for use, at the top of this panel (FIG. 11) and in the retracted position resting either on a member 76 of the body such as a bench-seat, chest or the like, or on a member of the fittings such as the first upper member 14, or directly on the floor 4 through the intermediary of feet as in the variation described for the piece of furniture 53.

The piece of furniture 75 is associated with third kinematic connecting means 77 connected to the panel 6a or to the panel 8a or to the hinge between the two panels 6a,8a.

In a first and second variation which are not shown, the means 77 are similar to the first and second embodiments of the means 63. In order to prevent the pieces of furniture 53,75 from interfering with each other and to prevent the piece of furniture 75 from interfering with the horizontal panel 8b, the piece of furniture 75 is sufficiently far from the upper part of the panel 8a in the first variation and the pieces of furniture 53,75 are offset one with respect to the other longitudinally in the second variation.

In a third variation (FIGS. 11 and 13) the means 77 make it possible to place the retracted piece of furniture 75 in an area which is not used, in particular in the immediate vicinity of the panel 6a. For example, the means 77 comprise a rigid frame 78, of general at least pseudo-flat shape, having a general pseudo-H shape, comprising two arms 79 and a horizontal cross bar 80 connecting the arms 79 by their central part, which surrounds the piece of furniture 75. At their first end (lower end when the piece of furniture 75 is in the position for use,)the arms 79 are arranged to pivot about a horizontal pivot 81, on a support 82 fixed rigidly to the panel 8a—in the manner of brackets. At their second upper end, when the piece of furniture 75 is in the position for use, the arms 79 are arranged to pivot on the piece of furniture 75, about a pivot 83 located in particular in the immediate vicinity of the upper and rear horizontal edge 84 of the piece of furniture 75 between its upper wall 85 and back wall 86. The pivots 81 and 83 are preferably located in the immediate vicinity of the panel 8a.

In the position for use, the piece of furniture 75 is suspended by the pivot 83, its back 86 being supported against the panel 8a, the frame 78 being directed upwards above the support 82. Securing means (bolts, catches etc) make it possible to retain this position.

The retracted piece of furniture 75 rests as mentioned above (in the case of FIG. 13) on the member 76, the securing means having been previously unlocked, the panel 8a being vertical, the frame 78 directed downwards below the support 82.

The distance between the pivot 81 and the support plane of the piece of furniture 75 is equal to or similar to the distance between the pivot 81 and the wall 87 of the piece of furniture 75 arranged horizontally, the piece of furniture 75 disengaged from the frame 78 being located substantially vertically.

The distance between the pivots 81 and 83 is equal to or similar to that between the pivots 81 and 9 (as regards the panel 8a) and the wall 85 of the retracted piece of furniture 75 is coplanar or in the vicinity of the plane P.

This construction makes it possible to mount on the frame 78 a curtain box 88 for a curtain 89 or a shelf for example in the central part of the arms 79, below the wall 87 when the piece of furniture 75 is in the position for use. Preferably, at their first end, the arms 79 form a right-angled bend 90 enabling the frame 78 to be placed against the panel 8a in the position for use of the piece of furniture 75 and to be moved away therefrom in the intermediate position (FIG. 12) and in the folded position (FIG. 13), which facilitates the housing of the curtain box 88 whereof the curtain 89 fits between the panels 6a, 8a in the piece of furniture 75. This variation of the means 77 is applicable to means 63.

In a variation (FIGS. 15 to 17), the means 39 comprise two arrangements of rods located either side of the piece of furniture 12 and connected to its walls 31 and 34, each comprising a pair of rods 40,91, each pivoted to the base 15 about pivots 42,43 and to the member 16 about pivots 44,45. The pivots 42,43,44,45 define a deformable parallelogram.

The rod 91 is rectilinear, extends beyond the pivot 45 and at its free end comprises a pivot 92 for connection to the panel 8b. The pivots 42,43,44,45 and 92 are parallel, horizontal and longitudinal.

The pivots 42 and 43, 44,45 have at least substantially the same position described previously. The pivot 92 is located in the vicinity of the pivot 45. The pivot 92 is mounted to slide transversely on the panel 8b, in a direction at right angles to the pivots 42,43,44,45,92. For example, (FIG. 17) the rod 91 is provided at is free end with rollers 93, mounted to rotate freely about the pivot 92, mounted in a straight guide track 94 having in cross section a general U shape comprising a web 95 connected rigidly to the inner side of the panel 8b, two sides 96 and two return members 97 directed towards each other, preventing any inopportune disengagement of the rollers 93 and constituting a surface on which the rollers run and for guiding the latter, in the same way as the web 95. The rolling and guide track 94 is rigidly connected to the panel 8b (screwing, sticking, welding). The length of the rolling and guide track 94 is at least equal to the sliding travel necessary for the pivot 92 in order to facilitate the passage of the member 16 between its position of use and its retracted position.

The guide tracks 94 may comprise at their upper and lower ends, abutments 98 which can possibly be detached.

The space 51 can be used for accommodating the guide track 94.

As a variation, the rod 91 is pivoted solely to the base 15 and to the panel 8b about pivots 43,92. A short rod is pivoted to the member 16 about the pivot 45 and to the rod 91.

The fittings may possibly comprise other pieces of furniture.

The kinematic connecting means 39,63,77 may form the subject of other variations as well as the pieces of furniture 11,12,53,75, whereof the front walls may constitute door or drawer components in all or part.

The invention also relates to the caravan 2, in particular a caravan which comprises the fittings 1. This caravan may be provided with unidirectional resilient means such as gas operated jacks located between the body 3 and the panels 8a,8b and/or the members 14,16 of the piece of furniture 53,75 or connected to the kinematic means 39,63,77.

Preferably, the jacks are pivoted to the body 3 and to the panels 8a,8b. They permanently bias the panels 8a,8b in the direction for opening out the caravan. These jacks are preferably located not partially outside or inside the caravan, in particular on the outer side or on the inner side of the panels which constitute the caravan, but are located at least partially in housings or grooves and chamfers cut in the actual thickness of said panels, covered on the outside and inside, in particular a housing or groove provided in a panel 5a,5b from its upper horizontal edge. In this case, the upper horizontal edges of the panels 5a,5b, 6a,6b may be coplanar.

Finally, the invention relates to a method for folding or opening out the caravan 2 comprising the fittings 1. At the time of folding the caravan, the member 14 is firstly moved from its position for use into its retracted position. Then, the panels 8b then 8a are moved successively from their vertical position into their horizontal position. Possibly, at the end of travel of the panel 8b, the member 54 is moved from its position for use into its retracted position.

In the case of the second embodiment of the kinematic means 63, after having moved the member 14 and before moving the panel 8b, the third piece of furniture 53 is moved into the retracted position.

In the case of fittings comprising a fourth piece of furniture 75, the folding operation comprises placing the latter in the retracted position before swinging the panel 8a.

In the variation of the means 39, at the time of swinging the panel 8b, the pivot 92 slides along the guide track 94 in particular as far as its extreme sliding position, furthest from the pivot 9, when the member 16 comes to rest on the wall 22 of the member 14.

What is claimed is:

1. Interior fittings of a folding vehicle structure comprising a lower body having a floor and four lower side panels, four side upper panels mounted to pivot on the lower panels, the fittings comprising a first piece of furniture having a first base rigidly connected to a first said lower side panel and a first upper member mounted to pivot on the first base about a first longitudinal pivot, said first upper member being able to move between a horizontal retracted position and a vertical position for use where it is connected to a first said upper side panel, a second piece of furniture having a second base connected rigidly to a second said lower side panel and a second movable upper member, the distance between the floor and the first pivot corresponding at least substantially to the overall depth of the first upper member in order that in the retracted position of the first upper member a front wall of the first upper member rests on the floor, wherein the height of the second base is at least equal to the sum of the depth of the first upper member and of the height of the second upper member, and wherein the second upper member is connected to the second base and to the second said upper side panel by first kinematic connecting means such that the movement of the second upper side panel causes the accompanying movement of the second upper member between an upper position for use in which it rests on the second base when the second upper side panel is vertical and a retracted lower position, when the second upper side panel is horizontal, in which it rests at least partly on a rear wall of the first upper member in the retracted position, the first and second pieces of furniture being located at least partly in facing relationship, the first kinematic connecting means also having the function of keeping the second upper member in a constant relative position.

2. Fittings according to claim 1, in which the first kinematic connecting means comprises first and second rods each pivoted to the second base and to the second upper member wherein these pivots comprise second, third, fourth and fifth pivots defining a deformable parallelogram, and a third rod connected to the first rod and to the second upper side panel about sixth and seventh pivots.

3. Fittings according to claim 2, in which the second rod comprises two inclined sections, the sixth pivot being located at the point at which said two sections join and cooperating with a slot, the second pivot is located in the vicinity of a front wall of the second base and of the plane of the rear wall of the first upper member in the retracted position, the third pivot is located approximately at an equal distance on the one hand from the front wall of the second base and from the second lower side panel and on the other hand from an upper wall of the second base and from the horizontal plane of the rear wall of the first upper member; the fourth pivot is located in the vicinity of a lower wall of the second upper member and substantially at an equal distance from front and rear walls of the second upper member; the fifth pivot is located in the vicinity of the rear wall and an upper wall of the second upper member; the seventh pivot is located in the vicinity of a horizontal plane passing through the upper wall of the second upper member when that member is in the position for use and the vertical second upper side panel.

4. Fittings according to claim 1, in which the first kinematic connecting means comprises first and second rods each pivoted to the second base and to the second upper member wherein these pivots comprise second, third, fourth and fifth pivots defining a deformable parallelogram, the second rod being connected kinematically to the second upper side panel about a sixth pivot mounted to slide transversely on said panel in a direction at right angles to the second, third, fourth and sixth pivots by means of rollers mounted in a guide track connected rigidly to the second upper side panel.

5. Fittings according to claim 4, in which the sixth pivot is located in the vicinity of the fifth pivot, the guide track is substantially rectilinear and comprises terminal abutments, and the second rod is substantially rectilinear.

6. Fittings according to claim 4 or claim 5, in which the second rod is pivotally connected to the second base and to the second upper panel about the third and sixth pivots and a short rod is pivotally connected to the second upper member about the fifth pivot and to the second rod.

7. Fittings according to claim 1, which further comprise a third movable piece of furniture intended to be connected to the second upper side panel, said third piece of furniture being connected to the second upper side panel by second kinematic connecting means such that the movement of the second upper side panel causes the accompanying movement of the third piece of furniture or at the least of a member of the latter piece of furniture between a position for use in which it is placed against the vertical second upper side panel and a retracted lower position in which it rests on the rear wall of the retracted first upper member.

8. Fittings according to claim 7, in which the third piece of furniture comprises the first mentioned member thereof and a second member mounted to pivot on the first member of the third piece about a pivot, the first member of the third piece of furniture being able to fit in the second member thereof.

9. Fittings according to claim 7 wherein the second kinematic connecting means comprises a bracket connected rigidly to the second upper side panel, and said bracket comprising a slot cooperating with a lug rigidly connected to the third piece of furniture.

10. Fittings according to claim 7, in which the second kinematic means comprises a frame comprising a web and two arms pivotally connected about a pivot to the second lower side panel or to the second upper side panel or to a hinge between these panels, the third piece of furniture being pivotally connected to the web.

11. Fittings according to claim 7, further comprising a fourth piece of furniture connected to the first upper side panel by a kinematic connecting means in the form of a frame comprising two arms pivotally connected to the first upper side panel by supports about a pivot and to said further or fourth piece of furniture about another pivot.

* * * * *